United States Patent
Shao et al.

(10) Patent No.: US 11,606,434 B1
(45) Date of Patent: Mar. 14, 2023

(54) INDUSTRIAL INTERNET OF THINGS WITH INDEPENDENT SENSOR NETWORK PLATFORM AND CONTROL METHODS THEREOF

(71) Applicant: CHENGDU QINCHUAN IOT TECHNOLOGY CO., LTD., Sichuan (CN)

(72) Inventors: Zehua Shao, Chengdu (CN); Haitang Xiang, Chengdu (CN); Xiaojun Wei, Chengdu (CN); Bin Liu, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/806,738

(22) Filed: Jun. 14, 2022

(51) Int. Cl.
*H04L 67/12* (2022.01)

(52) U.S. Cl.
CPC ................... *H04L 67/12* (2013.01)

(58) Field of Classification Search
CPC ....................................... H04L 67/12
See application file for complete search history.

(56) References Cited

U.S. PATENT DOCUMENTS

| | | | |
|---|---|---|---|
| 2018/0284758 A1* | 10/2018 | Celia | H04B 17/318 |
| 2021/0182996 A1* | 6/2021 | Cella | G06Q 30/0202 |
| 2022/0036302 A1* | 2/2022 | Cella | G06Q 10/083 |

OTHER PUBLICATIONS

Shao, Zehua, Exploration and Research on the Structure of Internet of Things, Internet of Things Technologies Reliable Transmission, 2015, 10 pages.
Shao, Zehua, The Internet of Things sense the world beyond the world, China Renmin University Press, 2017, 30 pages.
Shao, Zehua, Smart City Architecture, Internet of Things Technologies Intelligent Processing and Application, 2016, 7 pages.
White Paper on Urban Brain Development, Smart City Standard Working Group of National Beacon Commission, 2022, 59 pages.

* cited by examiner

*Primary Examiner* — Normin Abedin
(74) *Attorney, Agent, or Firm* — Metis IP LLC (57) ABSTRACT

The present disclosure discloses an industrial internet of things with an independent sensor network platform and control methods thereof, comprising: a user platform that interacts with users; a service platform that extracts and processes information required for processing the user platform from a management platform, and sends the information to the user platform; a management platform controls the operation of the object platform and receives feedback data from the object platform; a sensor network platform is configured as a communication network and a gateway for the interaction between the object platform and the management platform; an object platform is configured as production line devices and production line sensors that perform manufacturing. The service platform and management platform adopt a centralized layout, and the sensor network platform adopts an independent layout.

20 Claims, 4 Drawing Sheets

INDUSTRIAL INTERNET OF THINGS WITH INDEPENDENT SENSOR NETWORK PLATFORM AND CONTROL METHODS THEREOF

TECHNICAL FIELD

The present disclosure relates to intelligent manufacturing technology, in particular to industrial internet of things with an independent sensor network platform and control methods.

BACKGROUND

Industrial intelligent manufacturing technology has developed on a large scale, but the research on industrial intelligent manufacturing technology basically stays in the research of underlying technology, such as how to realize relevant requirements in the application of specific projects, which makes the applicability of intelligent manufacturing technology generally poor and easy to cause repeated development. At the same time, in the existing technology, the control calculation of industrial intelligent manufacturing technology and the communication network in the factory are often constructed uniformly, and all the communication calculation pressure is gathered in the transmission control center, resulting in a large load in the transmission control center and data traffic jam.

SUMMARY

The technical problem to be solved in the present disclosure is that the calculation pressure of the intelligent manufacturing technology in the existing technology is gathered in the transmission control center, resulting in a large load in the transmission control center and prone to data traffic jam. The purpose is to provide an industrial internet of things with an independent sensor network platform and control methods thereof to solve the above problems.

The present disclosure is realized through the following technical schemes.

On one hand, the present disclosure provides an industrial internet of things with an independent sensor network platform, comprising:

a user platform, a service platform, a management platform, a sensor network platform, and an object platform that interact in turn; wherein: the user platform is configured as a terminal device and interacts with a user;

the service platform is configured as a first server, receives an instruction of the user platform and sends it to the management platform, extracts information required for processing the user platform from the management platform, and sends the information to the user platform;

the management platform is configured as a second server, controls the operation of the object platform, and receives feedback data from the object platform;

the sensor network platform is configured as a communication network and a gateway for the interaction between the object platform and the management platform;

the object platform is configured as production line devices and production line sensors that perform manufacturing;

the service platform and the management platform adopt a centralized layout, and the sensor network platform adopts an independent layout; the centralized layout refers to that a platform uniformly receives data, uniformly processes data and uniformly sends data; the independent layout refers to a platform adopts different sub-platforms for data storage, data processing, and/or data transmission for different types of data;

the production line devices and the production line sensors of the object platform are classified into a plurality of types according to an upstream and downstream relationship of an assembly line, each type, as an object sub-platform, corresponds to a sensor network sub-platform of the sensor network platform, and each sensor network sub-platform includes an independent information channel and database; the database of each sensor network sub-platform is configured in the gateway; each object sub-platform corresponds to each sensor network sub-platform;

the second server classifies a control instruction according to the type of the production line devices and the production line sensors of the object platform to generate a classified control instruction when receiving the control instruction transmitted by the first server;

the second server generates different types of configuration files according to the classification control instruction, and sends the configuration files to the databases of the sensor network sub-platforms corresponding to the types of configuration files, respectively;

each sensor network sub-platform sends the configuration file in the database to a production line device and a production line sensor of the corresponding object sub-platform through the corresponding information channel.

Further, when the configuration files correspond to different execution times, the second server writes the execution times into the corresponding configuration files.

Processors of the sensor network sub-platforms extract the execution times and send the configuration files to the production line devices and the production line sensors in the corresponding object sub-platforms according to the execution times when the databases of the sensor network sub-platforms receive and store the configuration files; the processors of the sensor network sub-platforms are configured in the gateways.

Further, the second server obtains the production line device and the production line sensor of the object sub-platform corresponding to the control instruction as an object device when receiving the control instruction transmitted by the first server.

The second server sends the configuration file to the corresponding object device through the corresponding sensor network sub-platform if the object device is configured with a redundant device.

The second server sends a start instruction to the redundant device to start the redundant device, and the redundant device replaces the object device to work in the production line.

The object device accesses the production line and the redundant device is shut down after the configuration file is loaded by the object device.

Further, the second server obtains a startup time difference between a startup time of the object device and a startup time of the redundant device if the object device is configured with the redundant device; the startup time difference is a time required for one of the object device and the redundant device to start and take over the other.

The second server establishes a shutdown time and startup time of the object device as a first time according to the startup time difference, and establishes a startup time and shutdown time of the redundant device as a second time according to the startup time difference.

The second server packs the first time into the configuration file to form a first configuration file, and sends the first configuration file to the database of the sensor network sub-platform corresponding to the object device; the second server packs the second time into the configuration file to form a second configuration file, and sends the second configuration file to the database of the sensor network sub-platform corresponding to the redundant device.

The processor of the sensor network sub-platform sends the first configuration file to the object device according to the first time; the object device loads the first configuration file and is started up and shut down according to the first time.

The processor of the sensor network sub-platform sends the second configuration file to the redundant device according to the second time; the redundant device loads the second configuration file and is started up and shut down according to the second time.

Further, the second server obtains an associated device of the object device if the object device is not configured with the redundant device; the associated device is the affected production line device and production line sensor of the object platform which are located at the upstream of the object device when the object device is shut down.

The second server obtains a loading time of the object device, and establishes a shutdown time and startup time of the object device as a third time according to the loading time; the loading time is the time from being shut down to started up when the object device loads the configuration file.

The second server establishes a shutdown time and startup time of the associated device as a fourth time according to the loading time.

The second server packs the third time into the configuration file to form a third configuration file, and sends the third configuration file to the database of the sensor network sub-platform corresponding to the object device.

The processor of the sensor network sub-platform sends the third configuration file to the object device according to the third time; the object device loads the third configuration file and is shut down and started up according to the third time.

The second server sends the fourth time to the database of the sensor network sub-platform corresponding to the associated device.

The processor of the sensor network sub-platform sends the shutdown instruction and the startup instruction to the associated device according to the fourth time.

The associated device is shut down according to the shutdown instruction and is started up according to the startup instruction.

On the other hand, the embodiment of the present disclosure provides a control method of the industrial internet of things with an independent sensor network platform, applied to a user platform, a service platform, a management platform, a sensor network platform, and an object platform that interact in turn, wherein:

the user platform is configured as a terminal device and interacts with a user;

the service platform is configured as a first server, receives an instruction of the user platform and sends it to the management platform, extracts information required for processing the user platform from the management platform, and sends the information to the user platform;

the management platform is configured as a second server, controls the operation of the object platform, and receives feedback data from the object platform;

the sensor network platform is configured as a communication network and a gateway for the interaction between the object platform and the management platform;

the object platform is configured as production line devices and production line sensors that perform manufacturing;

the service platform and the management platform adopt a centralized layout, and the sensor network platform adopts an independent layout; the centralized layout refers to that a platform uniformly receives data, uniformly processes data and/or uniformly sends data; the independent layout refers to a platform adopts different sub-platforms for data storage, data processing, and/or data transmission for different types of data;

the production line devices and the production line sensors of the object platform are classified into a plurality of types according to an upstream and downstream relationship of an assembly line, each type, as an object sub-platform, corresponds to a sensor network sub-platform of the sensor network platform, and each sensor network sub-platform includes an independent information channel and database; the database of each sensor network sub-platform is configured in the gateway; each object sub-platform corresponds to each sensor network sub-platform; and the control method comprises:

classifying, by the second server, a control instruction according to the type of the production line devices and the production line sensors of the object platform to generate a classification control instruction when receiving the control instruction transmitted by the first server;

generating, by the second server, different types of configuration files according to the classification control instruction, and sends the configuration files to the databases of the sensor network sub-platforms corresponding to the types of configuration files, respectively;

sending, by each sensor network sub-platform, the configuration file in the database to a production line device and a production line sensor of the corresponding object sub-platform through a corresponding information channel.

Further, when the configuration files correspond to different execution times, the second server writes the execution times into the corresponding configuration files.

Processors of the sensor network sub-platforms extract the execution times and send the configuration files to the production line devices and the production line sensors in the corresponding object sub-platforms according to the execution times when the databases of the sensor network sub-platforms receive and store the configuration files; the processors of the sensor network sub-platforms are configured in the gateways.

Further, the second server obtains the production line device and the production line sensor of the object sub-platform corresponding to the control instruction as an object device when receiving the control instruction transmitted by the first server.

The second server sends the configuration file to the corresponding object device through the corresponding sensor network sub-platform if the object device is configured with a redundant device.

The second server sends a start instruction to the redundant device to start the redundant device, and the redundant device replaces the object device to work in a production line.

The object device accesses the production line and the redundant device is shut down after the configuration file is loaded by the object device.

Further, the second server obtains a startup time difference between a startup time of the object device and a startup time of the redundant device if the object device is configured with the redundant device; the startup time difference is a time required for one of the object devices and the redundant devices to start and take over the other.

The second server establishes a shutdown time and startup time of the object device as a first time according to the startup time difference, and establishes a startup time and shutdown time of the redundant device as a second time according to the startup time difference.

The second server packs the first time into the configuration file to form a first configuration file, and sends the first configuration file to the database of the sensor network sub-platform corresponding to the object device; the second server packs the second time into the configuration file to form a second configuration file, and sends the second configuration file to the database of the sensor network sub-platform corresponding to the redundant device.

The processor of the sensor network sub-platform sends the first configuration file to the object device according to the first time; the object device loads the first configuration file and is started up and shut down according to the first time.

The processor of the sensor network sub-platform sends the second configuration file to the redundant device according to the second time; the redundant device loads the second configuration file and is started up and shut down according to the second time.

Further, the second server obtains an associated device of the object device if the object device is not configured with the redundant device; the associated device is the affected production line device and production line sensor of object platform which are located at the upstream of the object device when the object device is shut down.

The second server obtains a loading time of the object device, and establishes a shutdown time and startup time of the object device as a third time according to the loading time; the loading time is the time from being shut down to started up when the object device loads the configuration file.

The second server establishes a shutdown time and startup time of the associated device as a fourth time according to the loading time.

The second server packs the third time into the configuration file to form a third configuration file, and sends the third configuration file to the database of the sensor network sub-platform corresponding to the object device.

The processor of the sensor network sub-platform sends the third configuration file to the object device according to the third time; the object device loads the third configuration file and is shut down and started up according to the third time.

The second server sends the fourth time to the database of the sensor network sub-platform corresponding to the associated device.

The processor of the sensor network sub-platform sends the shutdown instruction and the startup instruction to the associated device according to the fourth time.

The associated device is shut down according to the shutdown instruction and started up according to the startup instruction.

Compared with the prior art, the present disclosure has the following advantages and beneficial effects.

The industrial internet of things with an independent sensor network platform and control method in the present disclosure adopt the five-platform structure proposed by the inventor to build the intelligent manufacturing internet of things, in which each platform has corresponding hardware equipment. Because the service platform and management platform are centralized, and the sensor network platform is independent, in this way, the original unified sensor network platform has formed many independent communication networks. The gateway on each communication network can share part of the calculation for the management platform, effectively reducing the computing pressure of the management platform. Different communication networks are independent of each other, and also ensuring data security.

BRIEF DESCRIPTION OF THE DRAWINGS

The drawings described herein are used to provide a further understanding of the embodiments of the present disclosure, constitute a part of the present disclosure, and do not constitute a limitation of the embodiments of the present disclosure. In the attachment.

DETAILED DESCRIPTION

In order to make the purpose, technical scheme and advantages of the present disclosure clearer, the following is a further detailed description of the present disclosure in combination with the embodiments and drawings. The schematic embodiments and descriptions of the present disclosure are only used to explain the present disclosure and are not used as a limitation of the present disclosure. The terminology used herein is for the purpose of describing particular example embodiments only and is not intended to be limiting. As used herein, the singular forms "a," "an," and "the" may be intended to include the plural forms as well, unless the context clearly indicates otherwise, and the plural forms may be intended to include the singular form unless the context clearly indicates otherwise.

Embodiments

Figure 1:
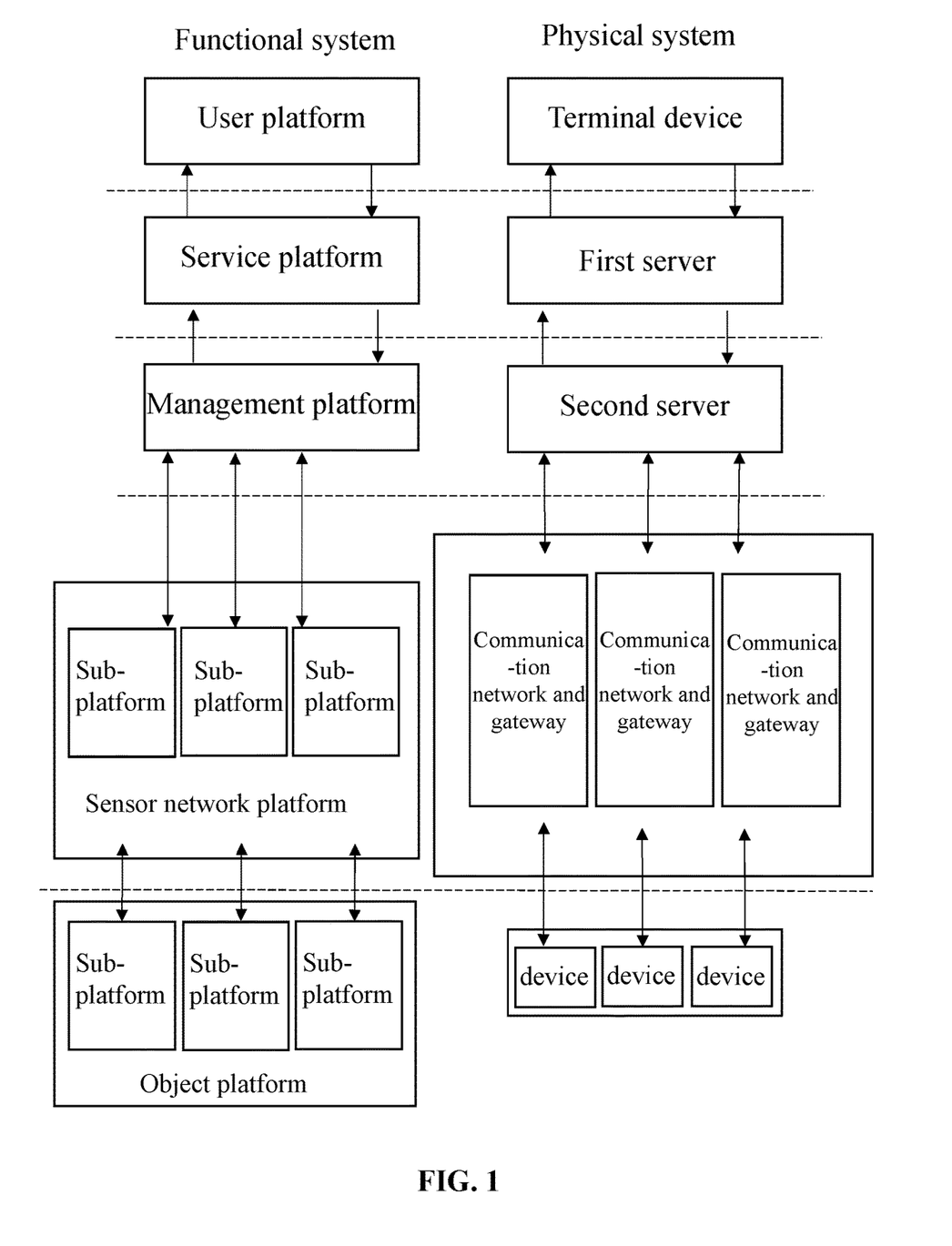
FIG. 1 is a schematic diagram of the architecture of the Embodiments of the present disclosure.

In order to facilitate the description of the above industrial internet of things with an independent sensor network platform, please refer to FIG. 1, providing the schematic diagram of the communication architecture of industrial internet of things with an independent sensor network platform disclosed in the Embodiment of the present disclosure. The industrial internet of things with an independent sensor network platform may include a user platform, a service platform, a management platform, a sensor network platform, and an object platform that interact in turn.

The user platform is configured as a terminal device and interacts with a user.

The service platform is configured as a first server, receives an instruction of the user platform and sends it to the management platform, extracts information required for processing the user platform from the management platform, and sends the information to the user platform.

The management platform is configured as a second server, controls the operation of the object platform, and receives feedback data from the object platform.

The sensor network platform is configured as a communication network and a gateway for the interaction between the object platform and the management platform.

The object platform is configured as production line devices and production line sensors that perform manufacturing.

The service platform and the management platform adopt a centralized layout, and the sensor network platform adopts an independent layout; the centralized layout refers to that a platform uniformly receives data, uniformly processes data and/or uniformly sends data; the independent layout refers to a platform adopts different sub-platforms for data storage, data processing, and/or data transmission for different types of data.

The production line devices and the production line sensors of the object platform are classified into a plurality of types according to an upstream and downstream relationship of an assembly line, each type, as an object sub-platform, corresponds to a sensor network sub-platform of the sensor network platform, and each sensor network sub-platform includes an independent information channel and database; the database of each sensor network sub-platform is configured in the gateway; each object sub-platform corresponds to each sensor network sub-platform.

The second server classifies a control instruction according to the type of the production line devices and the production line sensors of the object platform to generate a classification control instruction when receiving the control instruction transmitted by the first server.

The second server generates different types of configuration files according to the classification control instruction, and sends the configuration files to the databases of the sensor network sub-platforms corresponding to the types of configuration files, respectively.

Each sensor network sub-platform sends the configuration file in the database to the production line device and a production line sensor of the corresponding object sub-platform through a corresponding information channel, respectively.

In the specific embodiment, the user platform may be a desktop computer, tablet computer, notebook computer, mobile phone or other electronic device that can realize data processing and data communication, which is not limited here.

In the specific embodiment, the first server and the second server may adopt a single server or a server cluster, which is not limited here. It should be understood that the data processing process mentioned in the embodiment of the present disclosure may be processed by the processor of the server, and the data stored in the server may be stored on the storage device of the server, such as a hard disk and other memory.

In the specific embodiment, the gateway device of the sensor network platform in this embodiment should be an intelligent device with basic data processing, timing processing, and other functions, and should also have the functions of data storage and data transmission.

During the implementation of this embodiment, the five-platform structure proposed by the inventor is used to build the intelligent manufacturing internet of things, in which each platform has corresponding hardware device. Because the service platform and management platform adopt a centralized layout, and the sensor network platform adopts an independent layout, the original unified sensor network platform forms many independent communication networks. The gateway on each communication network may share part of the calculation for the management platform, which effectively reduces the calculation pressure of the management platform, and different communication networks are independent of each other, which also ensures the data security.

In this embodiment, the devices in the object platform are divided into a plurality of types according to the upstream and downstream relationship of the assembly line, each type has a special information channel and gateway, and the gateway is configured with a processor and a memory for storing the database. For example, if it is a hot processing production line, there are several types of devices according to the upstream and downstream relationship, which include devices for substrate placement, component assembly, solder spraying, reflow welding machine, and cooling. At this time, each type of device corresponds to a special information channel and gateway without interference with each other.

According to the above classification relationship, the second server classifies the control commands received each time and generates corresponding configuration files, each configuration file is sent by the second server to the corresponding sensor network sub-platform. In this way, if the configuration file itself has requirements such as timeliness, this part of the calculation may be transferred to the sensor network platform for calculation, so as to reduce the resource consumption of the second server, and thus, this method is very suitable for production lines with many links (stages).

In one embodiment, when configuration files corresponds to different execution times, the second server writes the execution times into the corresponding configuration files.

When the database of the sensor network sub-platform receives and stores the configuration file, the processor of the sensor network sub-platform extracts the execution time and sends the configuration file to the production line device and production line sensor in the corresponding object sub-platform according to the execution time; the processor of the sensor network sub-platform is configured in the gateway.

During the implementation of this embodiment, when the production device executes the configuration file, it is generally necessary to be shut down and read the configuration file, this process may face different execution times for different parts of the device. If this step is executed on the second server, many threads are required to monitor the distribution time of these configuration files, and these threads cannot hang in the background in the form of blocking, it will seriously occupy other control resources; in this embodiment, the time of sending the configuration file to the specific device is controlled and processed by the processor of the sensor network platform, for the second server, it only needs to complete the distribution of the configuration file without listening to the time corresponding to the configuration file, which reduces the count of threads wasted in this part.

In one embodiment, further, when the second server receives the control instruction transmitted by the first server, it obtains the production line device and production line sensor in the object sub-platform corresponding to the control instruction as the object device.

If the object device is configured with redundant devices, the second server sends the configuration file to the corresponding object device through the corresponding sensor network sub-platform.

The second server sends a start instruction to the redundant device through the sensing network sub-platform corresponding to the redundant device to start the redundant device, and the redundant device replaces the work of the object device in the production line.

The object device accesses the production line and shutdown the redundant device after the configuration file is loaded.

During the implementation of this embodiment, the inventor found that in the prior art, many production lines will cause huge losses if they are shut down, such as wafer production line, so these production lines often set redundant devices for many key parts to replace these devices when the production line devices fails. In view of this situation, this embodiment sets corresponding communication channel and gateway for redundant device and object device respectively. When sending the configuration file, the redundant device takes over the work of the object device, the object device loads a new configuration file, and then the object device takes over the work of the redundant device, realizing the uninterrupted work of the production line.

In one embodiment, if the object device is configured with the redundant device, the second server obtains the startup time difference between the object device and the redundant device; the startup time difference is the time required for any one of the object device and the redundant device to start and take over the other;

the second server establishes a shutdown time and startup time of the object device as a first time according to the startup time difference, and establishes the startup time and shutdown time of the redundant device as a second time according to the startup time difference.

The second server packs the first time into the configuration file to form a first configuration file, and sends the first configuration file to the database of the sensor network sub-platform corresponding to the object device; the second server packs the second time into the configuration file to form a second configuration file, and sends the second configuration file to the database of the sensor network sub-platform corresponding to the redundant device.

The processor of the sensor network sub-platform sends the first configuration file to the object device according to the first time; the object device loads the first configuration file and is started up and shut down according to the first time.

The processor of the sensor network sub-platform sends the second configuration file to the redundant device according to the second time; the redundant device loads the second configuration file and is started up and shut down according to the second time.

As explained in the previous embodiment, the redundant device and the target device need to make two handover of work, so the time needs to be strictly controlled, therefore, in this embodiment, the second server completes the establishment of time based on the startup time difference; it should be understood that those skilled in the art should be clear that the relationship between the first time and the second time is determined by the startup time difference. The second server controls the startup and shutdown time of the object device and redundant device by establishing the first time and the second time.

Before starting the redundant device, the second configuration file needs to be loaded, at this time, the processor of the sensor network platform sends the second configuration file according to the second time to realize the control, so that the configuration files of the redundant device and the object device may always be consistent.

In the second embodiment, the second server obtains an associated device of the object device if the object device is not configured with the redundant device; the associated device is the affected production line device and production line sensor of object platform which are located at the upstream of the object device when the object device is shut down.

The second server obtains a loading time of the object device, and establishes the shutdown time and startup time of the object device as a third time according to the loading time; the loading time is the time from being shut down to started up when the object device loads the configuration file.

The second server establishes the shutdown time and startup time of the associated device as a fourth time according to the loading time.

The second server packs the third time into the configuration file to form a third configuration file, and sends the third configuration file to the database of the sensor network sub-platform corresponding to the object device.

The processor of the sensor network sub-platform sends the third configuration file to the object device according to the third time; the object device loads the third configuration file and is shut down and started up according to the third time.

The second server sends the fourth time to the database of the sensor network sub-platform corresponding to the associated device.

The processor of the sensor network sub-platform sends the shutdown instruction and the startup instruction to the associated device according to the fourth time.

The associated device is shut down according to the shutdown instruction and started up according to the startup instruction.

Different from the previous embodiment, in this embodiment, the target device is not set with corresponding redundant device, at this time, it is necessary to stop the production line to load the configuration file, at this time, select the device related to the target device as the associated device. The selection method of the associated device may be realized by using the device association table, which is used to characterize the upstream and downstream relationship and association relationship of each device. In other words, when the target device is to be shut down, its corresponding associated device must be shut down. Through this selection method, the third time and the fourth time are determined by the loading time, similarly, in this embodiment, the processor in the sensor network platform is also used for time control, and the second server is used to calculate and generate the specific time, this method can effectively improve the update efficiency of the configuration file on the production line.

In some embodiments, the production process of the production device includes a production process of a plurality types of production devices arranged in a preset order to produce products, and each of the plurality types of production devices includes a plurality of working devices and at least one redundant device. The management platform may receive an instruction to produce a new product from the user platform. In response to the instruction, the management platform may determine a replaceable candidate redundant device corresponding to the working device based on a matching relationship between the at least one redundant device and the working device. The management platform may determine a replacement scheme based on the replaceable candidate redundant device corresponding to the working device. The replacement scheme may include a replaceable target redundant device corresponding to the working device. The management platform may send a replacement instruction to the working device in the object platform and its corresponding target redundant device based on the replacement scheme.

In some embodiments, the management platform may determine the count of the candidate redundant device corresponding to the working device. The management platform may determine the replacement priority of working device based on the count of candidate redundant device corresponding to working device. The management platform may determine the replacement scheme based on the priority of replacement.

In some embodiments, the management platform may perform weighted summation to determine the count of candidate redundant device based on taking the loading success rate of each candidate redundant device as the weight.

In some embodiments, in response to the count of the candidate redundant device corresponding to the working device is the same, the management platform may determine the replacement priority of the working device based on the loading success rate of each candidate redundant device.

In some embodiments, in response to when the count of candidate redundant device corresponding to the working device is the same, the management platform may determine the priority based on the upstream device of the working device and the predicted loading completion time. The management platform may determine the replacement priority of working device based on priority.

In some embodiments, the management platform may obtain the confidence of the predicted loading time corresponding to the predicted loading completion time. In response to the predicted loading time is greater than the threshold, the management platform may determine the priority based on the predicted loading time.

In some embodiments, the replacement scheme is carried out by a plurality of rounds of iteration.

In some embodiments, the sensor network platform may predict the predicted loading time of the parameters (or predicted parameter loading time) of each production device for producing a new product. The sensor network platform may determine the loading plan of redundant device based on the predicted loading time. The loading plan includes the loading start time point (or start time point of the loading) of each device in each type of production devices. The sensor network platform may send loading instruction to the redundant device of the object platform based on the loading plan.

The sensor network platform may determine a loading plan of the redundant device based on the predicted loading time, and the loading plan includes a start time point of loading of each device of each type of production devices.

In some embodiments, an input of the prediction model also includes the actual loading time of other production device that has been loaded.

In some embodiments, the sensor network platform may include a plurality of sensor network sub-platforms. Each sensor network sub-platform of the plurality of sensor network sub-platforms corresponds to each type of production devices, respectively. Each sensor network sub-platform is used to control the parameter loading of the corresponding production device(s).

In some embodiments, the object platform may include a plurality of object sub-platforms, and each object sub-platform in the plurality of object sub-platforms corresponds to each type of production devices, respectively.

Figure 2:
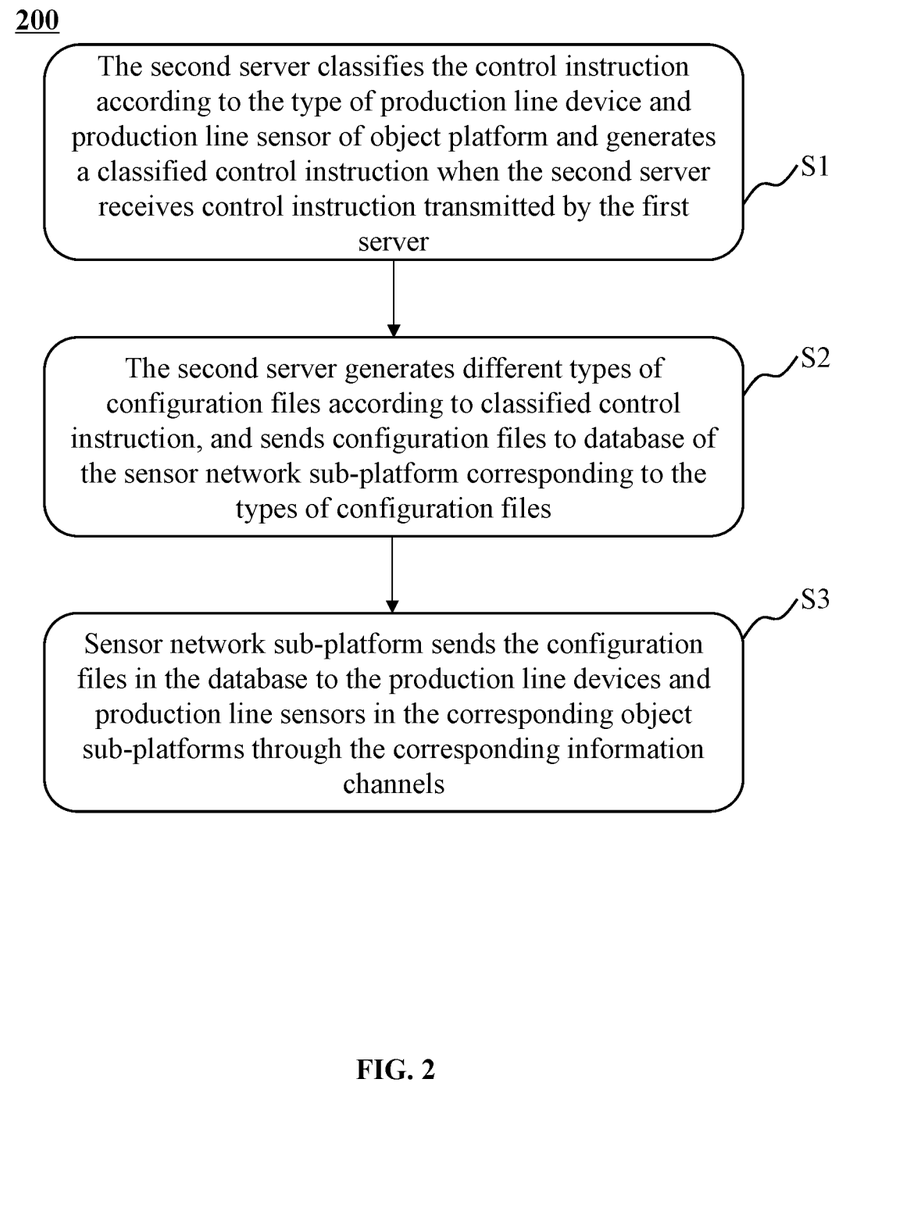
FIG. 2 is a schematic diagram of steps of the method of the Embodiments of the present disclosure.

On the basis of the above, please refer to FIG. 2, a flowchart illustrating the control method of the industrial internet of things with an independent sensor network platform provided by the embodiments of the present disclosure. The control method of the industrial internet of things with an independent sensor network platform may be applied to the system of the industrial internet of things with an independent sensor network platform in FIG. 1. Further, the control method of the industrial internet of things with an independent sensor network platform may specifically include the contents described in the following steps S1 to S3.

S1: the second server classifies a control instruction according to a type of a production line device and a type of a production line sensor of the object platform and generates a classified control instruction when the second server receives a control instruction transmitted by the first server;

S2: the second server generates different types of configuration files according to the classification control instruction (or classified control instruction), and sends the configuration files to the database of the sensor network sub-platforms corresponding to the types of configuration files;

S3: the sensor network sub-platform sends the configuration files in the database to the production line devices and production line sensors in the corresponding object sub-platforms through the corresponding information channels.

In one embodiment, when the configuration files correspond to different execution times, the second server writes the execution times into the corresponding configuration files.

The processors of the sensor network sub-platforms extract the execution times and send the configuration files to the production line devices and the production line sensors in the corresponding object sub-platforms according to the execution times when the database of the sensor network sub-platforms receive and store the configuration files, respectively; the processors of the sensor network sub-platform are configured in the gateway.

In one embodiment, the second server obtains a production line device and a production line sensor in an object sub-platform corresponding to the control instruction as an object device when receiving the control instruction transmitted by the first server.

The second server sends a configuration file to the corresponding object device through the corresponding sensor network sub-platform if the object device is configured with a redundant device.

The second server sends a start instruction to the redundant device to start the redundant device, and the redundant device replaces the object device to work in the production line.

The object device accesses the production line and closes the redundant device after loading the configuration file.

In one embodiment, the second server obtains the startup time difference between the object device and the redundant device if the object device is configured with a redundant device; the startup time difference is the time period required for any one of the object device and the redundant device to start and take over the other one.

The second server establishes a shutdown time and startup time of the object device as a first time according to the startup time difference, and establishes the startup time and shutdown time of the redundant device as a second time according to the startup time difference.

The second server packs the first time into the configuration file to form a first configuration file, and sends the first configuration file to the database of the sensor network sub-platform corresponding to the object device; the second server packs the second time into the configuration file to form a second configuration file, and sends the second configuration file to the database of the sensor network sub-platform corresponding to the redundant device.

The processor of the sensor network sub-platform sends the first configuration file to the object device according to the first time; the object device is started up, loads the first configuration file, and is shut down according to the first time.

The processor of the sensor network sub-platform sends the second configuration file to the redundant device according to the second time; the redundant device loads the second configuration file and is started up and according to the second time.

In one embodiment, the second server obtains an associated device of the object device if the object device is not configured with a redundant device; the associated device is the affected production line devices and production line sensors of object platform which are located upstream of the object device when the object device is shut down.

The second server obtains a loading time of the object device, and establishes the shutdown time and startup time of the object device as a third time according to the loading time; the loading time is the time period from being shut down to started up when the object device loads the configuration file.

The second server establishes the shutdown time and startup time of the associated device as the fourth time according to the loading time.

The second server packs the third time into the configuration file to form a third configuration file, and sends the third configuration file to the database of the sensor network sub-platform corresponding to the object device.

The processor of the sensor network sub-platform sends the third configuration file to the object device according to the third time; the object device loads the third configuration file and is shut down and started up according to the third time.

The second server sends the fourth time to the database of the sensor network sub-platform corresponding to the associated device.

The processor of the sensor network sub-platform sends the shutdown instruction and the startup instruction to the associated device according to the fourth time.

The associated device is shut down according to the shutdown instruction and started up according to the startup instruction.

Figure 3:
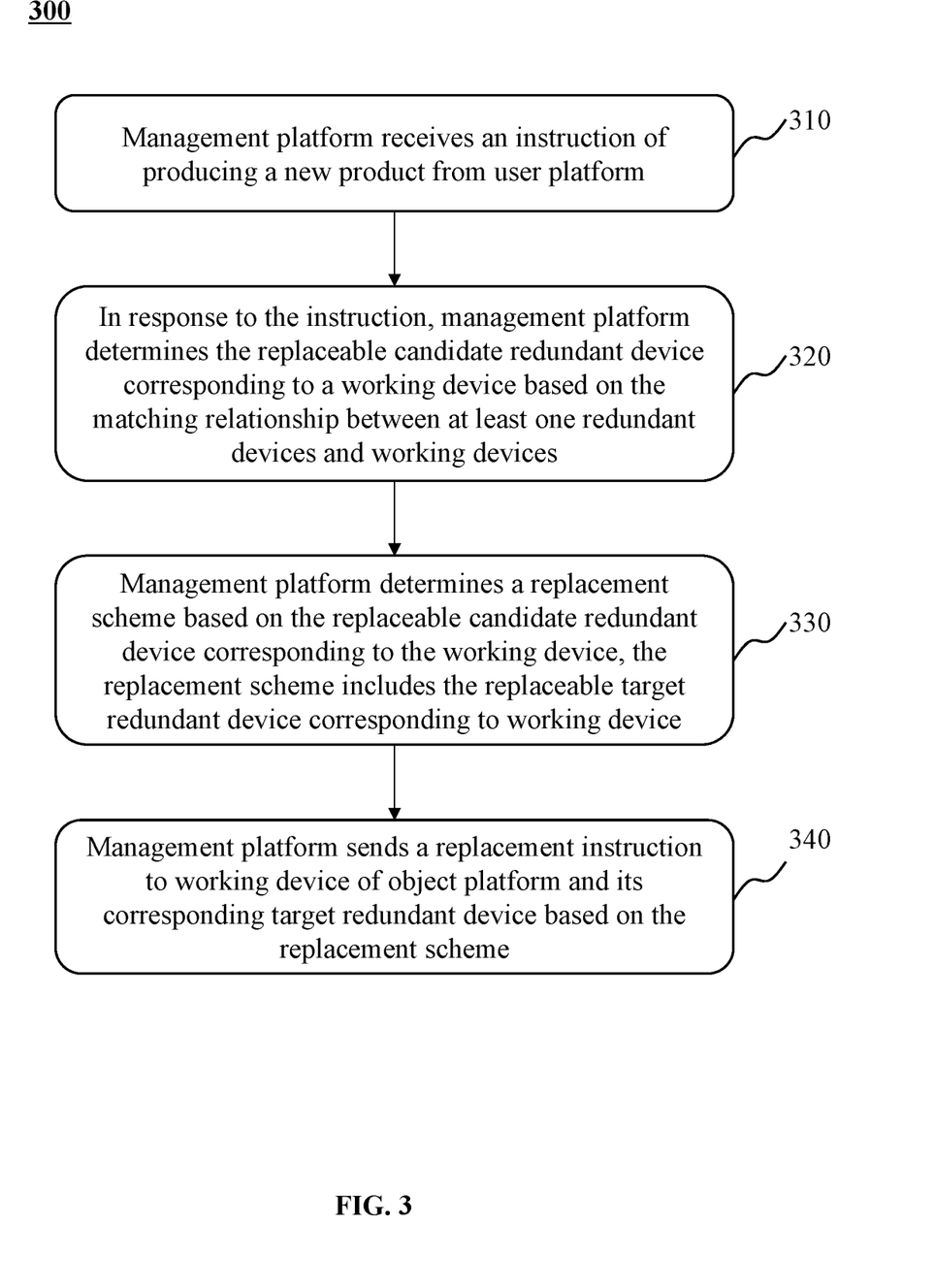
FIG. 3 is a flowchart illustrating an exemplary process for controlling the production process by industrial internet of things according to some embodiments of the present disclosure.

FIG. 3 is a flowchart illustrating an exemplary process for controlling the production process by the internet of things according to some embodiments of the present disclosure. As shown in FIG. 3, the process 300 includes the following steps. In some embodiments, the process 300 may be executed by the management platform.

In some embodiments, in a production line, various types of production devices may be arranged according to different production links or processes during the production of products by the production line. The production process of production devices may have a sequence. A plurality types of production devices may be arranged according to the preset order to produce products. Each of a plurality type of production devices may include a plurality of working devices and one or more redundant devices. The working device may refer to a device in production. The redundant device may refer to a spare device. The redundant device may replace the working device for work when the working device fails to work normally (such as abnormalities, replacement, etc.) to maintain the continuous operation of the production line and reduce the time of parameter loading.

In step 310, the management platform receives an instruction of producing a new product from the user platform.

When the production line needs to produce new products, the specifications and requirements of new products are different, and the production device of the production line needs to adjust parameters. The production device may load the production parameters of new products. In some embodiments, the management platform may receive instructions to produce new products from the user platform. For example, the user inputs the instruction of producing new products through the user platform, and the instruction may be that production line 1 starts to producing new product A. The management platform may receive the user-input's instruction to produce new product A from the user platform.

In step 320, in response to the instruction, the management platform determines a replaceable candidate redundant device corresponding to a working device based on the matching relationship between at least one redundant device and the working devices.

The matching relationship may refer to whether the redundant device is matched with the working device. For example, whether the model matches, whether the location is close, etc. The candidate redundant device refers to a redundant device that meets the matching relationship with the working device, for example, a redundant device that matches the model of the working device.

In some embodiments, the management platform may determine replaceable candidate redundant devices corresponding to the working devices based on the matching relationship between one or more redundant devices and the working devices. For example, working device 1 matches redundant devices A and C, and working device 2 matches redundant device B. The management platform may determine redundant devices A and C as replaceable candidate redundant devices corresponding to working device 1. The management platform may determine the redundant device B as a replaceable candidate redundant device corresponding to the working device 2.

In step 330, the management platform determines a replacement scheme based on the replaceable candidate redundant device corresponding to the working device, the replacement scheme including a replaceable target redundant device corresponding to the working device.

The replacement scheme may refer to the specific contents of how to replace the device. In some embodiments, the replacement scheme may include a replaceable target redundant device corresponding to the working device, replacement time, replacement priority, etc.

The target redundant device corresponding to the working device may refer to a determined final candidate redundant device that may replace the working device. For example, as described in the above example, the replaceable target redundant device corresponding to the working device 1 may be redundant device A. The replaceable target redundant device corresponding to working device 2 may be redundant device B.

The management platform may determine the replacement scheme in a plurality of ways. In some embodiments, the replacement scheme may be determined based on the loading success rate of the candidate redundant device corresponding to the working device. For example, the loading success rates of redundant devices A, B and C are 90%, 85% and 80%, respectively. The management platform may determine a candidate redundant device with relatively high loading success rate as a target redundant device. The management platform may preferentially replace the working device corresponding to the candidate redundant device with high loading success rate. The replacement scheme determined by the management platform is as follows: the replaceable target redundant device corresponding to working device 1 is A; the replaceable target redundant device corresponding to working device 2 is B; and the replacement priority is to replace working device 1 first, and then replace working device 2, etc.

In some embodiments, the management platform may determine a count of candidate redundant devices corresponding to the working device. The management platform may determine the replacement priority of working device based on the count of candidate redundant devices corresponding to working device. The management platform may determine the replacement scheme based on the replacement priority.

The count of candidate redundant devices corresponding to the working device may refer to the count of candidate redundant devices matched with the working device. The count of candidate redundant devices corresponding to different working devices may be the same or different. For example, the count of candidate redundant devices corresponding to working device 3 and working device 4 are 4 and 3, respectively.

In some embodiments, the management platform may determine the count of candidate redundant devices corresponding to the working device. For example, t the management platform may determine candidate redundant devices matched with different working devices, thereby determining the count of candidate redundant devices corresponding to different working devices. For example, through matching, the management platform may determine that the count of candidate redundant devices corresponding to work device 1, work device 2, work device 3 and work device 4 are 2, 1, 4 and 3, respectively. In some embodiments, the candidate redundant devices corresponding to different working devices may be the same candidate redundant device. For example, candidate redundant device E may match both working device 3 and working device 4.

The replacement priority of the working device may refer to the order in which the working device loads new product parameters. For example, the replacement priority of the work device is work device 2, work device 3, work device 4, work device 1, etc. The work devices may load the new product parameters of the working devices according to the above replacement priority.

In some embodiments, the management platform may determine the replacement priority of the working device based on the count of candidate redundant devices corresponding to the working device. For example, the management platform may sort the count of candidate redundant devices corresponding to the working device from small to large. The management platform may preferentially replace the working device corresponding to a small count of candidate redundant devices. As described in the above example, the replacement priority of work device 1 to work device 4 are in the following: work device 2 (the corresponding count is 1), work device 1 (the corresponding count is 2), work device 4 (the corresponding count is 3), and work device 3 (the corresponding count is 4).

In some embodiments, the management platform may determine a replacement scheme based on the replacement priority. For example, as described in the above example, the corresponding scheme is as follows: the replacement priority is that the working device 2 is replaced in preference to the working device 1, which is replaced in preference to the working device 4, which is replaced in preference to the working device 3.

In some embodiments of the present disclosure, the management platform may preferentially replace the working device corresponding to a small count of candidate redundant devices, avoiding the corresponding candidate redundant devices replacing other working devices, and avoiding that no candidate redundant device may replace the working device corresponding to a small count of candidate redundant devices.

In some embodiments, the management platform may determine the count of candidate redundant devices by weighted summation based on the loading success rate of each candidate redundant device as the weight.

The loading success rate may refer to the probability that a device successfully loads parameters. In some embodiments, the management platform may determine the loading success rate according to the historical loading record statistics of each candidate redundant device. For example, the candidate redundant device F has 20 history loading records, the count of successful loading is 16, and the loading success rate of the candidate redundant device F is 80%.

In some embodiments, the management platform may determine the count of candidate redundant devices corresponding to the working device by weighted summation based on the loading success rate of each candidate redundant device as the weight. For example, there are three candidate redundant devices corresponding to working device 4, and the corresponding loading success rates are 50%, 80% and 90%, respectively. The count of working device candidates is 1.80%*2.2%*1.50%*2.2%. For another example, there are two candidate redundant devices corresponding to working device 1, and the corresponding loading success rates are 70% and 90% respectively. The count of candidate redundant device corresponding to working device 1 is 1.6 (1*70%+1*90%=1.6).

In some embodiments, the management platform may preset a loading success rate threshold. The management platform may determine the count of candidate redundant devices corresponding to the working device based on the loading success rate threshold. The loading success rate threshold may refer to the minimum loading success rate for determining the count of candidate redundant devices. For example, the loading success rate threshold is 80%. The management platform may determine the count of candidate redundant devices whose loading success rate is greater than and/or equal to 80% as the count of candidate redundant devices corresponding to the working device. As described in the above example, the count of candidate redundant devices corresponding to working device 4 is 2. The count of candidate redundant devices corresponding to working device 1 is 1.

In some embodiments of the present disclosure, the management platform may eliminate the device with high probability of failure to load parameters among the candidate redundant devices, which can ensure the successful loading of candidate redundant devices to a certain extent, and reduce the waiting time of production devices in the production process.

In some embodiments, in response to that the count of candidate redundant devices corresponding to the working devices is the same, the management platform may determine the replacement priority of the working devices based on the loading success rate of each candidate redundant device. For example, the management platform may preferentially replace a working device corresponding to the candidate redundant device with a high loading success rate. For example, the candidate redundant devices corresponding to working device 5 and working device 6 are candidate redundant device G (loading success rate 88%) and candidate redundant device H (loading success rate 95%). The management platform may determine that the working device 6 is replaced in priority to the working device 5.

In some embodiments of the present disclosure, the management platform determines the replacement priority of working devices based on the loading success rate of each candidate redundant device. The management platform may ensure that the working device corresponding to the candidate redundant device with high loading success rate is replaced in priority, so as to reduce the waiting time of production device in the production process.

In some embodiments, in response to that the count of candidate redundant devices corresponding to the working devices is the same, the management platform may determine the priority of different working devices based on the upstream devices of the working devices and the predicted loading completion time. The management platform may determine the replacement priority of the working devices based on the priority of different working devices.

An upstream device of a working device may refer to a production device of a previous process adjacent to the working device. For example, in the SMT production line, the working device is a dispensing machine, and the upstream device of the working device is the screen printing machine, etc. The predicted loading completion time may refer to the time when the device completes the loading of parameters. In some embodiments, the predicted loading completion time may include a time corresponding to the predicted loading completion time and the predicted loading duration. For example, the predicted loading time point of the working device is 10:10, the time corresponding to the predicted loading completion time is 10:11, and the predicted loading duration is 1 minute.

Priority may refer to a priority level at which the working device is replaced. There are high and low priorities. For example, the priority may include a first priority (highest priority), a second priority (higher priority), and the like.

In some embodiments, the management platform may set a higher priority for working devices with a large count of upstream devices and a short predicted loading completion time. The management platform may preferentially replace the corresponding working device with the higher priority.

In some embodiments of the present disclosure, the management platform may preferentially replace the corresponding working device with higher priority, which can ensure that the working device corresponding to a large count of upstream device is replaced first, so as to reduce the waiting time of production device in the whole production process.

In some embodiments, the management platform may obtain the confidence of the predicted loading duration corresponding to the predicted loading completion time. When the confidence of the predicted loading duration is greater than the threshold, the management platform may determine the priority based on the predicted loading duration.

The predicted loading duration may refer to the time taken by the devices to load parameters. The confidence of the predicted loading duration may refer to the confidence degree of predicting the loading duration. The confidence in predicting the loading duration may be expressed by a value between 0 and 1. The larger the value, the more credible the predicted loading duration is. The threshold may refer to the lowest confidence that may be trusted to predict the loading duration. For example, the threshold may be 0.9 or 0.95, etc. The management platform may preset the threshold. The management platform may set the threshold value according to the actual need.

In some embodiments, the management platform may obtain the confidence of the predicted loading duration corresponding to the predicted loading completion time through a prediction model. For the confidence of the predicted loading duration corresponding to the predicted loading completion time obtained through the prediction model, please refer to the relevant description in FIG. 4 for details.

In some embodiments, the management platform may determine the priority according to the predicted loading duration. The management platform may determine that a working device with short predicted loading duration has higher priority. For example, the confidence of the predicted loading duration corresponding to working device 7 and working device 8 is greater than the threshold (e.g., 0.9). The predicted loading duration of working device 7 and working device 8 is 1 minute and 30 seconds, respectively. The management platform may determine that the priority of work device 8 is higher than that of work device 7.

In some embodiments of the present disclosure, when the confidence of the predicted loading duration is greater than the threshold, the management platform may determine the priority based on the predicted loading duration. The management platform may ensure the accuracy of the predicted loading duration to a certain extent, and then ensure the accuracy of the priority of working device, further ensure that the corresponding working device with short predicted loading duration is replaced first, so as to reduce the waiting time of production device in the whole production process.

In some embodiments, the management platform may carry out the replacement scheme through a plurality of rounds of iteration. For example, the management platform may determine, based on the count of working devices corresponding to candidate redundant devices corresponding to a working device with the first priority, the replacement priority of the corresponding candidate redundant devices, and then determine a target redundant device corresponding to the working device with the first priority. The management platform may replace the working device of the second priority and the third priority by repeating the above process until there is no replaceable device.

For example, the candidate redundant devices corresponding to working device 9 with the first priority are A and B, and the candidate redundant devices corresponding to working device 10 with the second priority are B, C and D. The management platform may set that the more the count of working devices corresponding to a candidate redundant device, the lower the priority of the candidate redundant device. Candidate redundant device A corresponds to one working device 9, and candidate redundant device B corresponds to two working devices. The priority of candidate redundant device A is higher than that of candidate redundant device B. The management platform may first determine that the target redundant device of the working device 9 with first priority is A. The management platform may then determine the target redundant device of the working device 10 with the second priority. Candidate redundant devices C and D correspond to one working device 10, and candidate redundant device B corresponds to two working devices. The priority of candidate redundant devices C and D is higher than that of candidate redundant device B. The management platform may determine that the target redundant device of working device 10 with the second priority is one of C or D.

In some embodiments of the present disclosure, the management platform carries out the replacement scheme through a plurality of rounds of iteration. The management platform may perform replacement according to the priority of working device until there is no replaceable device, which can ensure the priority of replacement and reduce the waiting time of production device in the whole production process.

In step 340, the management platform sends a replacement instruction to the working device in the object platform and its corresponding target redundant device based on the replacement scheme.

The replacement instruction may refer to an instruction on how to replace between devices. The replacement instruction may include replacement time, replaceable target redundant device corresponding to different working device, etc. In some embodiments, the replacement instruction may be a classification control instruction, and different types of working devices correspond to different replacement instructions. For example, different types of work devices have different replacement time. The replacement instructions corresponding to a plurality of working devices of the same type are also different. For example, the replacement time corresponding to working devices with different priorities is different.

In some embodiments, the management platform may send different replacement instructions to different working devices in the object platform and their corresponding target redundant devices based on the replacement scheme. For example, the management platform may send a replacement instruction (replacement time 10:10, etc.) to the working device 9 and the target redundant device A.

In some embodiments, if there is a device that has not been replaced in the working device, the management platform may send an instruction directly to load and produce a new product. For example, in the production line, there are five working devices and three redundant devices, three redundant devices have been replaced, and two of the working devices have not been replaced, and the management platform may send the instruction of directly loading parameters of producing new products to the two working devices that have not been replaced. The two working devices may directly load the parameters of producing new products for production.

In some embodiments, when the replacement of the working device and the target redundant device is completed, the target redundant device becomes the working device, and the original working device becomes the redundant device.

In some embodiments of the present disclosure, when the management platform receives the instruction to produce new products, it may determine the replacement scheme based on the matching relationship between redundant devices and working devices. The management platform may ensure that redundant device may replace working device in time through the above methods, reducing the waiting time of production device in the production process, so as to ensure that the production line may be put into production as soon as possible.

Figure 4:
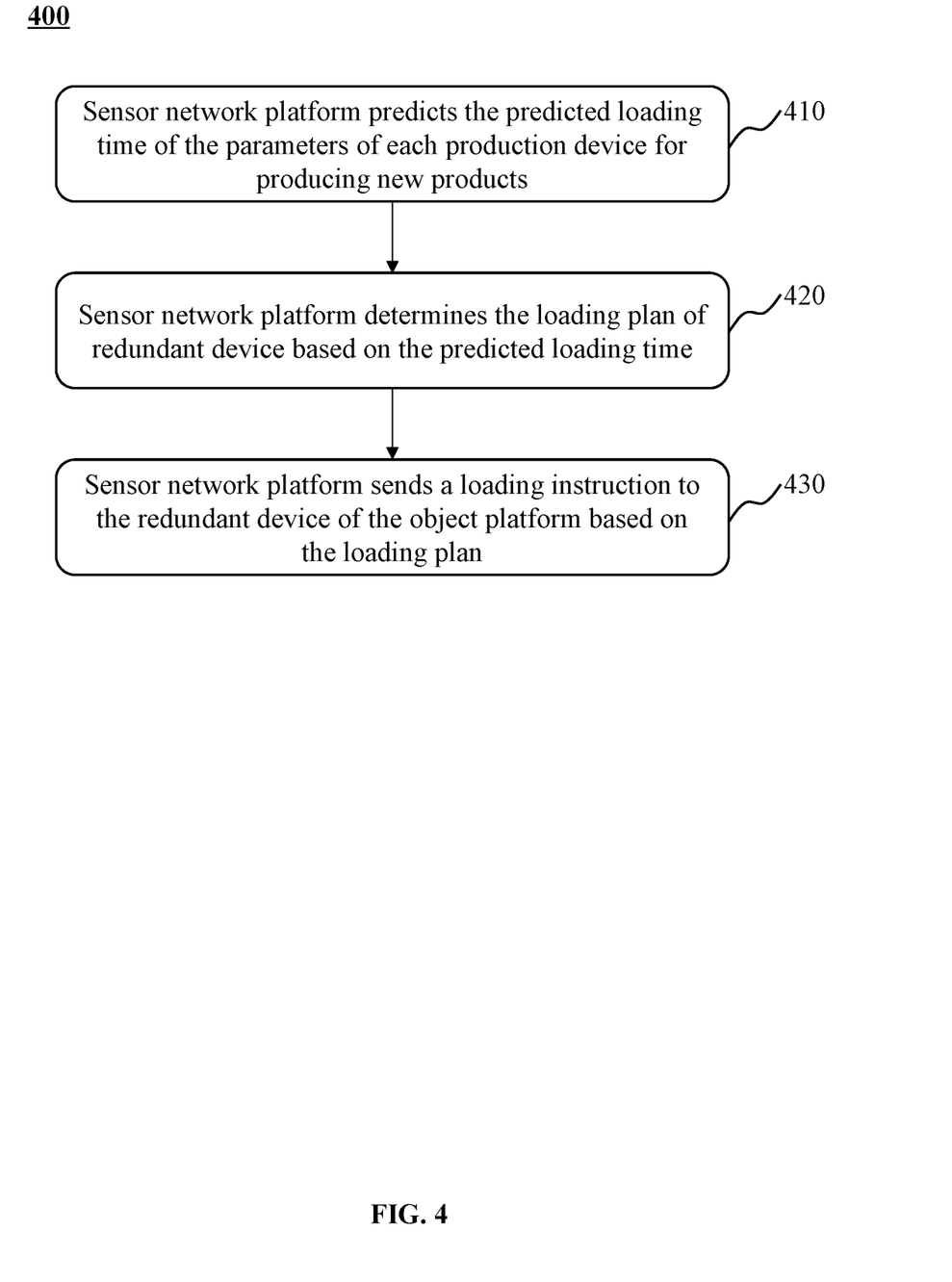
FIG. 4 is a flowchart illustrating an exemplary process for determining a loading plan and sending a loading instruction by a sensor network platform according to some embodiments of the present disclosure.

FIG. 4 is a flowchart illustrating an exemplary process for determining a loading plan and sending a loading instruction by a sensor network platform according to some embodiments of the present disclosure. As shown in FIG. 4, the process 400 includes the following steps. In some embodiments, process 400 may be performed by a sensor network platform.

In step 410, the sensor network platform predicts a predicted loading time of the parameters of each type of production devices for producing new products.

The predicted loading time may refer to the estimated time when the device loads the production parameters of new products. The predicted loading time is different for different production devices. The predicted loading time may include the start time point of loading and the predicted loading duration, etc. The start time point of loading may refer to the time when the device starts loading. The predicted loading duration may refer to a time period when the device is loading, for example, 30 seconds, 1 minute, etc.

In some embodiments, the sensor network platform may predict the predicted loading time of the parameters for each type of production devices for production of the new product. For example, the sensor network platform may predict the predicted loading time of each type of production devices according to the device type of each type of production devices and the production requirements of the planned product.

In some embodiments, the sensor network platform may process the type of production device and the production requirements of planned products based on the prediction model to determine the predicted loading duration of each type of production devices.

The prediction model refers to a model that may predict the loading duration. In some embodiments, the type of prediction model may include neural network model, deep neural network, etc., and the selection of model type may depend on the specific situation. In some embodiments, the input of the prediction model may include the device type of each type of production devices, the production requirements of the planned products, etc. The production requirements of planned products may refer to the requirements for the production of new products. Different new products have different production requirements. The count of production parameters of new products may affect the loading time. The output of the prediction model may include the predicted loading duration of each type production device.

In some embodiments, the input of the prediction model may also include the actual loading time of other production devices that have loaded, etc. The actual loading time may refer to the actual loading time of the device, for example, 40 seconds, 65 seconds, etc. In some embodiments, the input of the prediction model may be dynamically updated. For example, when a production device has completed the parameter loading of new product production, the sensor network platform may input the actual loading duration of other production devices that have loaded into the prediction model.

In some embodiments, the output of the prediction model may include confidence of the predicted loading duration. The more data on the actual loading duration of other production devices that have loaded the parameters, the higher the confidence of the predicted loading duration of each type of production devices output by the prediction model. The higher the confidence of the predicted loading duration, the more credible the predicted loading duration of the production device output by the prediction model.

In some embodiments, the sensor network platform may input the type of production device, the production requirements of planned products, and the actual loading duration of other production devices that have loaded into the prediction model. The prediction model outputs the predicted loading duration and the confidence of the predicted loading duration of each type of production devices.

In some embodiments, a prediction model may be obtained based on a plurality of training samples and label training.

In some embodiments, a training sample includes the type of sample production device, the production requirements of the sample products planned to be produced, the actual loading duration of other sample production devices have loaded, etc. The label is the predicted loading duration of each type of sample production devices. Training data may be obtained based on historical data. The label of training data may be determined by manual annotation or automatic annotation. For example, the sensor network platform may perform automatic annotation by determining the actual loading time of each type of production devices according to the historical data.

In some embodiments, the sensor network platform may improve the confidence of the predicted loading duration of each type of production devices output by the prediction model by increasing the data of the actual loading duration of other production devices that have loaded. In some embodiments, the sensor network platform may preset a confidence threshold, such as 0.9. When the confidence is greater than or equal to 0.9, the sensor network platform may take the predicted loading duration output by the prediction model as the loading duration of a redundant device, and update the parameters for production.

In some embodiments of the present disclosure, the sensor network platform determines the predicted loading duration of each type of production devices through the prediction model. Through the above method, the accuracy of predicting the loading duration may be improved. The sensor network platform inputs the actual loading duration of other production devices that have loaded into the prediction model. The actual loading duration of other production devices that have loaded has reference significance for the predicted loading duration of the devices to load the parameters for new product production. Dynamically updating the actual loading duration of other production devices may improve the confidence of the prediction model in the prediction results of the predicted loading duration, in order to reduce the waiting time of production device in the production process, so as to ensure that the production line can be put into production as soon as possible.

In step 420, the sensor network platform determines a loading plan of a redundant device based on the predicted loading time.

The loading plan of the redundant device may refer to the plan of how the redundant device loads parameters. In some embodiments, the loading plan of the redundant device includes the start time point of the loading of each device in each type of production devices. In some embodiments, the start time point of loading of all redundant devices may be the same. For example, the sensor network platform may take the preset time point before the end of production of all current products as the start time point of the loading. The start time point may be determined based on the maximum predicted loading duration. For example, the maximum predicted loading duration in a production device is 5 minutes, the production end time of all current products is 11:50, and the sensor network platform may determine 11:45 as the start time point of the loading.

In some embodiments, start time points of the loading of different redundant devices may be different. For example, the preset time point before the end of the production of the current product by a production device is used as start time point of the loading of the production device. The sensor network platform may determine the start time point of the loading based on the predicted loading duration of the device. For example, the predicted loading duration of production device A is 2 minutes, and the end time of the current product production is 11:48. The sensor network platform may determine 11:46 as the start time point of the loading of the production device A.

In step 430, the sensor network platform sends a loading instruction to the redundant device of the object platform based on the loading plan.

Redundant instruction refers to the instruction related to the loading control device. Loading instructions may include parameters of production of new products and the start time point of loading. In some embodiments, the sensor network platform may send loading instructions to redundant devices of the object platform based on the loading plan. For example, a loading instruction sent by the sensor network platform to the production device A is that the start time point of the loading is 11:46, and the parameter of new product production is parameter 1.

Through the above methods, the sensor network platform may ensure that all redundant devices complete loading parameters of the production of new products before the replacement of the working device and target redundant device, thereby reducing the waiting time of production device in the production process, so as to ensure that the production line may be put into production as soon as possible.

In some embodiments, the sensor network platform may include a plurality of sensor network sub-platforms. Each sensor network sub-platform of a plurality of sensor network sub-platforms may correspond to each type of the production devices. Each sensor network sub-platform may be used to control the parameter loading of the corresponding production device.

The sensor network sub-platform and the object sub-platform may be configured with special information channel and gateway. Through the information channel and gateway, control instructions may be sent to control the production device, such as parameters loading, accessing, startup and shutdown of the production device. For example, the sensor network platform includes three sensor network sub-platforms: sensor network sub-platform 1, sensor network sub-platform 2 and sensor network sub-platform 3. The sensor network sub-platform 1 may be used to control the production device A. The sensor network sub-platform 2 may be used to control the production device B. The sensor network sub-platform 3 may be used to control the production device C.

In some embodiments, the object platform may include a plurality of object sub-platforms. Each object sub-platform of a plurality of object sub-platforms may correspond to each type of production devices. For example, in the SMT production line, a plurality of types of production devices may include screen printing machine, dispensing machine, patch machine, curing machine, reflow soldering machine, etc. A plurality of object sub-platforms of the object platform may include screen printing machine-object sub-platform, dispensing machine-object sub-platform, patch machine-object sub-platform, curing machine-object sub-platform, reflow soldering machine-object sub-platform, etc.

Those skilled in the art can realize that the units and algorithm steps of each example described in combination with the embodiments disclosed herein may be realized by electronic hardware, computer software or a combination of the two. In order to clearly illustrate the interchangeability of hardware and software, the composition and steps of each example have been generally described according to function in the above description. Whether these functions are performed in hardware or software depends on the specific application and design constraints of the technical scheme. Professional technicians may use different methods to realize the described functions for each specific application, but this realization should not be considered beyond the scope of the present disclosure.

In several embodiments provided in the present disclosure, it should be understood that the disclosed devices and methods can be realized in other ways. For example, the device embodiment described above is only schematic. For example, the division of the unit is only a logical function division, and there may be another division mode in actual implementation. For example, a plurality of units or components may be combined or integrated into another system, or some features may be ignored or not executed. In addition, the mutual coupling or direct coupling or communication connection shown or discussed may be indirect coupling or communication connection through some interfaces, devices or units, or electrical, mechanical or other forms of connection.

The unit described as a separate part may or may not be physically separated. As a unit, those skilled in the art may realize that the unit and algorithm steps of each example described in combination with the embodiments disclosed herein may be realized by electronic hardware, computer software or a combination of the two. In order to clearly illustrate the interchangeability of hardware and software. In the above description, the composition and steps of each example have been generally described according to the function. Whether these functions are performed in hardware or software depends on the specific application and design constraints of the technical scheme. Professional technicians may use different methods to realize the described functions for each specific application, but this realization should not be considered beyond the scope of the present disclosure.

In addition, each functional unit in each embodiment of the present disclosure may be integrated into one processing unit, each unit may exist separately, or two or more units may be integrated into one unit. The above integrated units may be realized in the form of hardware or software functional units.

If the integrated unit is realized in the form of software functional unit and sold or used as an independent product, it may be stored in a computer-readable storage medium. Based on this understanding, the technical solution of the present disclosure is essentially or part of the contribution to the prior art, or all or part of the technical solution may be embodied in the form of software product, which is stored in a storage medium. It includes several instructions to enable a computer device (which may be a personal computer, server, grid device, etc.) to perform all or part of the steps of the method described in each embodiment of the present disclosure. The aforementioned storage media include: USB flash disk, mobile hard disk, read only memory (ROM), random access memory (RAM), magnetic disc or optical disc and other media that may store program code.

The specific embodiments described above further detail the purpose, technical scheme and beneficial effects of the present disclosure. It should be understood that the above are only the specific embodiments of the present disclosure and are not used to limit the scope of protection of the present disclosure. Any modification, equivalent replacement, improvement, etc. made within the spirit and principles of the present disclosure should be included in the scope of protection of the present disclosure.

What is claimed is:

1. An industrial internet of things with an independent sensor network platform, comprising: a user platform, a service platform, a management platform, a sensor network platform, and an object platform that interact in turn, wherein the user platform is configured as a terminal device and interacts with a user;

the service platform is configured as a first server, receives an instruction of the user platform and sends it to the management platform, extracts information required for processing the user platform from the management platform, and sends the information to the user platform;

the management platform is configured as a second server, controls the operation of the object platform, and receives feedback data from the object platform;

the sensor network platform is configured as a communication network and a gateway for the interaction between the object platform and the management platform;

the object platform is configured as production line devices and production line sensors that perform manufacturing;

the service platform and the management platform adopt a centralized layout, and the sensor network platform adopts an independent layout; the centralized layout refers to that a platform uniformly receives data, uniformly processes data and uniformly sends data; the independent layout refers to a platform adopts different sub-platforms for data storage, data processing, and/or data transmission for different types of data;

the production line devices and the production line sensors of the object platform are classified into a plurality of types according to an upstream and downstream relationship of an assembly line, each type, as an object sub-platform, corresponds to a sensor network sub-platform of the sensor network platform, and each sensor network sub-platform includes an independent information channel and database; the database of each sensor network sub-platform is configured in the gateway; each object sub-platform corresponds to each sensor network sub-platform;

the second server classifies a control instruction according to the types of the production line devices and the production line sensors of the object platform to generate a classification control instruction when receiving the control instruction transmitted by the first server;

the second server generates different types of configuration files according to the classified control instruction, and sends the configuration files to the databases of the sensor network sub-platforms corresponding to the types of configuration files, respectively;

each sensor network sub-platform sends the configuration file in the database to a production line device and a production line sensor of the corresponding object sub-platform through the corresponding information channel.

2. The industrial internet of things with the independent sensor network platform according to claim 1, wherein when the configuration files correspond to different execution times, the second server writes the execution times into the corresponding configuration files;

processors of the sensor network sub-platforms extract the execution times and send the configuration files to the production line devices and the production line sensors in the corresponding object sub-platforms according to the execution times when the databases of the sensor network sub-platforms receive and store the configuration files; the processors of the sensor network sub-platforms are configured in the gateways.

3. The industrial internet of things with the independent sensor network platform according to claim 2, wherein the second server obtains a production line device and a production line sensor of an object sub-platform corresponding to the control instruction as an object device when receiving the control instruction transmitted by the first server;

the second server sends the configuration file to the corresponding object device through the sensor network sub-platform corresponding to the object device if the object device is configured with a redundant device;

the second server sends a start instruction to the redundant device to start the redundant device, and the redundant device replaces the object device to work in a production line;

the object device accesses the production line and the redundant device is shut down after the configuration file is loaded by the object device.

4. The industrial internet of things with the independent sensor network platform according to claim 3, wherein the second server obtains a startup time difference between a startup time of the object device and a startup time of the redundant device if the object device is configured with the redundant device; the startup time difference is a time required for one of the object device and the redundant device to start and take over the other;

the second server establishes a shutdown time and startup time of the object device as a first time according to the startup time difference, and establishes a startup time and shutdown time of the redundant device as a second time according to the startup time difference;

the second server packs the first time into the configuration file to form a first configuration file, and sends the first configuration file to the database of the sensor network sub-platform corresponding to the object device; the second server packs the second time into the configuration file to form a second configuration file, and sends the second configuration file to a database of a sensor network sub-platform corresponding to the redundant device;

the processor of the sensor network sub-platform sends the first configuration file to the object device according to the first time; the object device loads the first configuration file and is started up and shut down according to the first time;

the processor of the sensor network sub-platform sends the second configuration file to the redundant device according to the second time; the redundant device loads the second configuration file and is started up and shut down according to the second time.

5. The industrial internet of things with the independent sensor network platform according to claim 3, wherein the second server obtains an associated device of the object device if the object device is not configured with the redundant device; the associated device is an affected production line device and production line sensor of the object platform which are located at the upstream of the object device when the object device is shut down;

the second server obtains a loading time of the object device, and establishes a shutdown time and startup time of the object device as a third time according to the loading time; the loading time is a time from being shut down to started up when the object device loads the configuration file;

the second server establishes a shutdown time and startup time of the associated device as a fourth time according to the loading time;

the second server packs the third time into the configuration file to form a third configuration file, and sends the third configuration file to the database of the sensor network sub-platform corresponding to the object device;

the processor of the sensor network sub-platform sends the third configuration file to the object device according to the third time; the object device loads the third configuration file and is shut down and started up according to the third time;

the second server sends the fourth time to a database of a sensor network sub-platform corresponding to the associated device;

the processor of the sensor network sub-platform sends a shutdown instruction and a startup instruction to the associated device according to the fourth time;

the associated device is shut down according to the shutdown instruction and is started up according to the startup instruction.

6. The industrial internet of things with the independent sensor network platform according to claim 1, wherein a production process of a production device includes a process of a plurality types of production devices arranged in a preset order to produce products, and each of the plurality types of production devices includes a plurality of working devices and at least one redundant device;

the management platform is configured to perform the following operations comprising:

receiving an instruction of producing a new product from the user platform;

in response to the instruction, determining a replaceable candidate redundant device corresponding to each of the working devices based on a matching relationship between the at least one redundant device and the working devices;

determining a replacement scheme based on the replaceable candidate redundant device corresponding to the each of the working devices, and the replacement scheme including a replaceable target redundant device corresponding to the each of the working devices;

sending a replacement instruction to the each of the working devices in the object platform and its corresponding target redundant device based on the replacement scheme.

7. The industrial internet of things with the independent sensor network platform according to claim 6, wherein the sensor network platform is configured to perform the following operations comprising:

predicting a predicted loading time of parameters by each type of the plurality types of production devices for producing the new product;

determining a loading plan of the redundant device based on the predicted loading time, the loading plan including a start time point of loading of each device in each type of the plurality types of production devices;

sending a loading instruction to the redundant device of the object platform based on the loading plan.

8. The industrial internet of things with the independent sensor network platform according to claim 7, wherein the sensor network platform comprises a plurality of sensor network sub-platforms, each sensor network sub-platform of the plurality of sensor network sub-platforms corresponds to each type of the plurality types of production devices, and the each sensor network sub-platform is used to control the parameter loading of the corresponding production devices.

9. The industrial internet of things with the independent sensor network platform according to claim 7, wherein the object platform comprises a plurality of object sub-platforms, and each of the plurality of object sub-platforms corresponds to each type of the plurality types of production devices.

10. A control method for an industrial internet of things with an independent sensor network platform, applied to a user platform, a service platform, a management platform, a sensor network platform, and an object platform that interact in turn, wherein the user platform is configured as a terminal device and interacts with a user;

the service platform is configured as a first server, receives an instruction of the user platform and sends it to the management platform, extracts information required for processing the user platform from the management platform, and sends the information to the user platform;

the management platform is configured as a second server, controls the operation of the object platform, and receives feedback data from the object platform;

the sensor network platform is configured as a communication network and a gateway for the interaction between the object platform and the management platform;

the object platform is configured as production line devices and production line sensors that perform manufacturing;

the service platform and the management platform adopt a centralized layout, and the sensor network platform adopts an independent layout; the centralized layout refers to that a platform uniformly receives data, uniformly processes data and uniformly sends data; the independent layout refers to a platform adopts different sub-platforms for data storage, data processing, and/or data transmission for different types of data;

the production line devices and the production line sensors of the object platform are classified into a plurality of types according to the an upstream and downstream relationship of an assembly line, each type, as an object sub-platform, corresponds to a sensor network sub-platform of the sensor network platform, and each sensor network sub-platform includes an independent information channel and database; the database of each sensor network sub-platform is configured in the gateway; each object sub-platform corresponds to each sensor network sub-platform; and the control method comprises:

classifying, by the second server, a control instruction according to the types of the production line devices and the production line sensors of the object platform to generate a classification control instruction when receiving the control instruction transmitted by the first server;

generating, by the second server, different types of configuration files according to the classified control instruction, and sends the configuration files to the databases of the sensor network sub-platforms corresponding to the types of configuration files, respectively;

sending, by each sensor network sub-platform, the configuration file in the database to a production line device and a production line sensor of the corresponding object sub-platform through the corresponding information channel.

11. The control method according to claim 10, wherein when the configuration files correspond to different execution times, the second server writes the execution times into the corresponding configuration files;

processors of the sensor network sub-platforms extract the execution times and send the configuration files to the production line devices and the production line sensors in the corresponding object sub-platforms according to the execution times when the databases of the sensor network sub-platforms receive and store the configuration files; the processors of the sensor network sub-platforms are configured in the gateways.

12. The control method according to claim 11, wherein the second server obtains a production line device and a production line sensor of an object sub-platform corresponding to the control instruction as an object device when receiving the control instruction transmitted by the first server;

the second server sends the configuration file to the corresponding object device through the sensor network sub-platform corresponding to the object device if the object device is configured with a redundant device;

the second server sends a start instruction to the redundant device to start the redundant device, and the redundant device replaces the object device to work in a production line;

the object device accesses the production line and the redundant device is shut down after the configuration file is loaded by the object device.

13. The control method according to claim 12, wherein the second server obtains a startup time difference between a startup time of the object device and a startup time of the redundant device if the object device is configured with the redundant device; the startup time difference is a time required for one of the object device and the redundant device to start and take over the other;

the second server establishes a shutdown time and startup time of the object device as a first time according to the startup time difference, and establishes a startup time and shutdown time of the redundant device as a second time according to the startup time difference;

the second server packs the first time into the configuration file to form a first configuration file, and sends the first configuration file to the database of the sensor network sub-platform corresponding to the object device; the second server packs the second time into the configuration file to form a second configuration file, and sends the second configuration file to a database of a sensor network sub-platform corresponding to the redundant device;

the processor of the sensor network sub-platform sends the first configuration file to the object device according to the first time; the object device loads the first configuration file and is started up and shut down according to the first time; and the processor of the sensor network sub-platform sends the second configuration file to the redundant device according to the second time; the redundant device loads the second configuration file and is started up and shut down according to the second time.

14. The control method according to claim 12, wherein the second server obtains an associated device of the object device if the object device is not configured with the redundant device; the associated device is an affected production line device and production line sensor of the object platform which are located at the upstream of the object device when the object device is shut down;

the second server obtains a loading time of the object device, and establishes a shutdown time and startup time of the object device as a third time according to the loading time; the loading time is a time from being shut down to started up when the object device loads the configuration file;

the second server establishes a shutdown time and startup time of the associated device as a fourth time according to the loading time;

the second server packs the third time into the configuration file to form a third configuration file, and sends the third configuration file to the database of the sensor network sub-platform corresponding to the object device;

the processor of the sensor network sub-platform sends the third configuration file to the object device according to the third time; the object device loads the third configuration file and is shut down and started up according to the third time;

the second server sends the fourth time to a database of a sensor network sub-platform corresponding to the associated device;

the processor of the sensor network sub-platform sends a shutdown instruction and a startup instruction to the associated device according to the fourth time; and the associated device is shut down according to the shutdown instruction and is started up according to the startup instruction.

15. The control method according to claim 10, wherein a production process of a production device includes a process of a plurality of production devices arranged in a preset order to produce products, and each of the plurality types of production devices includes a plurality of working devices and at least one redundant device; and the control method comprises:

receiving, by the management platform, an instruction of producing a new product from the user platform;

in response to the instruction, determining, by the management platform, a replaceable candidate redundant device corresponding to each of the working devices based on a matching relationship between the at least one redundant device and the working devices;

determining, by the management platform, a replacement scheme based on the replaceable candidate redundant device corresponding to the each of the working devices, and the replacement scheme includes a replaceable target redundant device corresponding to the each of the working devices; and sending, by the management platform, a replacement instruction to the each of the working devices in the object platform and its corresponding target redundant device based on the replacement scheme.

16. The control method according to claim 15, wherein the determining, by the management platform, a replacement scheme based on the replaceable candidate redundant device corresponding to the each of the working devices comprises:

determining a count of the candidate redundant device corresponding to the each of the working devices;

determining a replacement priority of the each of the working devices based on the count of the candidate redundant device corresponding to the each of the working devices; and determining the replacement scheme based on the replacement priority.

17. The control method according to claim 16, wherein the replacement scheme is carried out through a plurality of rounds of iteration.

18. The control method according to claim 15, wherein the control method further comprises:

predicting a predicted loading time of parameters by each type of the plurality types of production devices for producing the new product;

determining a loading plan of the redundant device based on the predicted loading time, the loading plan including a start time point of loading of each device in each type of the plurality types of production devices;

sending a loading instruction to the redundant device of the object platform based on the loading plan.

19. The control method according to claim 18, wherein the sensor network platform comprises a plurality of sensor network sub-platforms, each sensor network sub-platform of the plurality of sensor network sub-platforms corresponds to each type of the plurality types of production devices, and the each sensor network sub-platform is used to control the parameter loading of the corresponding production devices.

20. The control method according to claim 18, wherein the object platform comprises a plurality of object sub-platforms, and each of the plurality of object sub-platforms corresponds to each type of the plurality types of production devices.

* * * * *